United States Patent [19]

Emerson et al.

[11] 4,025,354
[45] May 24, 1977

[54] UREA CONTAINING SIZING COMPOSITIONS

[75] Inventors: Ralph Waldo Emerson, Boston, Mass.; John R. Shattuck, Cumberland Foreside, Maine

[73] Assignee: Plasmine Corporation, Portland, Maine

[22] Filed: Jan. 30, 1975

[21] Appl. No.: 545,537

Related U.S. Application Data

[63] Continuation of Ser. No. 358,296, May 8, 1973, abandoned.

[52] U.S. Cl. .............................. 106/218; 106/219; 106/236; 260/102
[51] Int. Cl.$^2$ ....................................... C08L 93/04
[58] Field of Search ............ 260/102, 103; 252/8.1; 106/15 FP; 162/159, 158, 180, 173

[56] References Cited

UNITED STATES PATENTS 2,423,556  7/1947  Feibelmann ...................... 162/159

OTHER PUBLICATIONS

Chem. Abst. 67:66165x, 1967.

*Primary Examiner*—Theodore Morris
*Attorney, Agent, or Firm*—Morton, Bernard, Brown, Roberts & Sutherland

[57] ABSTRACT

This invention is directed to novel sizing agent compositions containing urea which is chemically modified and/or combined with other materials which produce desirable sizing properties. These novel agents are used as beater additives in pulp refining for the manufacture of cellulosic products or are applied to finished cellulosic products as surface sizes. The invention is also directed to methods of making the sizing agents. In one preferred embodiment, urea is reacted with sulfamic acid and the resulting reaction product is combined with rosin and further reacted to produce a novel sizing agent.

58 Claims, No Drawings

UREA CONTAINING SIZING COMPOSITIONS

This is a continuation of application Ser. No. 358,296, filed May 8, 1973, now abandoned.

This invention is directed to novel size compositions containing urea, to the methods of making the compositions, and to the methods of using them in the production of cellulosic products.

Cellulosic products — paper, rigid paper, paperboard, molded products, and the like — basically are produced by applying a dilute suspension or solution of fibers in an aqueous medium onto a fine mesh screen through which the aqueous medium drains, leaving a thin mat of fibers. The mat is removed from the screen, further liquid is expressed and the sheet is dried to form the desired product. The fibrous raw materials used in this process are generally one or more of the several types of commercially available pulp. These pulps include mechanical pulps, or groundwoods, bleached or unbleached, and chemical pulps, for example bleached, unbleached, and semi-bleached sulfate and sulfite pulps, as well as semi-chemical pulps. Other constituents used as the fibrous paper and paperboard-making raw materials include reclaimed waste papers, cotton fibers, inorganic and synthetic organic fibers, and mixtures of these materials.

The first step in paper product manufacture is pulp stock preparation. Pulps are most conveniently handled in the form of a slurry to facilitate their mechanical treatment, non-fibrous additive mixing, and their delivery to the paper machine. Pulps are fed to the paper mill in a slurry directly from the pulping operation where both the pulping and papermaking are performed at the same location; otherwise, they are received as dry sheets or laps, and must be slushed before use. Slushing separates the fibers and disperses them in the aqueous medium with minimum detrimental mechanical effect so as to produce a consistently uniform starting material. The pulp slush or slurry is subjected to mechanical action known as beating or refining before being formed into a paper sheet. During refining, the fibers are swollen, cut, macerated, and frayed controllably to produce smaller fibrillar elements and to thereby desirably affect the physical properties of the resulting end product. Unbeaten pulp produces a light, fluffy, weak paper, whereas well-beaten pulp yields stronger, denser paper. During the beating or refining process, many non-fibrous materials are added to the pulp solution. Among these are mineral pigments for filling and loading, such as kaolin, titanium dioxide, calcium carbonate, and other well known filling materials, coloring additives and dyes, sizing agents, and other known beater additives.

After the pulp slurry has been beaten and refined and the additives mixed into it, this pulp slurry or "furnish" is delivered to continuous sheet forming equipment, such as a cylinder machine or a Fourdrinier, where it is discharged onto fine mesh screen through which the liquid carrier or aqueous medium drains and on which a fibrous mat is formed. This fibrous mat or sheet contains, for example, about 80% water when it leaves the screening and is therefore passed through one or more rotary presses for more water removal and is subsequently passed through a drying system, for example, steamheated rotating cylinders, to yield the finished product.

The sizing agents, as mentioned, are added to the refining process pulp slurry so as to render the finished product resistant to liquid penetration. In the alternative, the sizing agents may be excluded from the "beater additives" and may be applied to the paper after it is dried with very effective penetration resistance. In this method, the dry sheet is passed through a size solution or over a roll wetted with a size solution. Such sheets are "tub sized" or "surface sized."

Among the materials currently used as sizing agents are rosin, various hydrocarbon and natural waxes, starches, glues, casein, asphalt emulsions, synthetic resins, and cellulose derivatives. Rosin is one of the most widely used and most effective sizing agents. Rosin may be refined from pine trees and stumps, or it may be extracted from paper mill slurries containing the fiber of pine trees. The latter is known as tall oil. Extracted rosin is often partially saponified with caustic soda, and processed to yield a thick paste of 70 to 80% solids, of which up to 30 to 40% is free saponified rosin. Dry rosin and completely saponified rosin are also used as sizing agents. Any of these rosins may further be fortified, for example, by the addition of maleic anhydride or other supplement. At the paper mill, the rosin paste is diluted, for example to about 3% solids, with hot water under vigorous agitation. This solution is either used for surface sizing or is added to the stock, for example 0.5 to 3.0% size based on dry fiber, usually before, but sometimes simultaneously with, for example, one to three times as much aluminum sulfate (papermakers alum). The aluminum sulfate is believed to precipitate the rosin on the fibers as flocculated particles.

It has now been discovered that novel sizing compositions can be produced which are more effective than the well known rosin types and are compatible with presently used pulp and stock materials and additives. These novel sizing agents contain commercially available urea, chemically modified and/or combined with other materials which produce desirable sizing properties. The compositions of the present invention exhibit superior properties with equivalent or lesser amounts than formerly used in conventional sizing compositions, and do so at a lower cost. The products resulting from their use are brighter and stronger than those produced by the presently available sizing agents. Due to the increased swelling effect of the new sizes, the resulting cellulosic products experience an increase in bulk and, therefore, a decrease in density. The novel sizing agents also assist in the drying of the sheet when employed as a beater additive so that the paper forming machine may be speeded up to produce a sheet of the same moisture content. Alternatively, more water may be added to the pulp stock to give the fiber on the paper machine wire a better orientation, thereby producing a stronger paper with superior formation.

The novel sizing compositions are produced by subjecting commercially available urea to a sulfamic acid treatment and/or combining it with a solution of, for example, stearic acid or fatty amide, such as Kemamine P-190 or P-970 made by Kraftco Corp., chromic acid, ammonia, and water. The resulting compositions are then employed alone as a sizing agent in pulp stock or in surface sizing, or are combined with commercially known sizing agents to replace a substantial part of those known agents, acting as sizing agents themselves. It has been discovered that the novel sizing compositions, when combined with known sizing agents, do not act as extenders, but as sizing agents, and the known agents act as carriers. Thus, although the novel compositions may erroneously be considered an extender when combined with known agents, in fact, the known agent becomes the extender and carrier for the novel composition. In some preferred embodiments, the novel size is used in amounts equal to or exceeding the amount of known size, and in one embodiment, preferably three times as much novel size is used as known size. The fact that many of the sizing compositions are most advantageously used to completely replace known sizing compositions leaves no doubt that the novel compositions are sizing agents and not merely extenders.

The sizing compositions are produced by novel methods which, in many instances, involve multi-stage processes. The preferred sizing composition of this invention comprises urea treated with sulfamic acid and water, and mixed with rosin size. This novel size is produced in three stages. The first stage involves combining urea with sulfamic acid and water. Ideally, the parts by weight of water equal the parts by weight of urea plus sulfamic acid, although the urea may be treated with the sulfamic acid with more water or with little or no water. In this first stage, the urea-sulfamic acid solution is heated to a temperature which causes a change in the pH of the solution from an acidic pH to a basic pH, for example to a rise in the pH to at least about 7.5. When little or no water is used, the temperature affecting the pH may be higher. In the preferred embodiment, however, where a 50% water, 50% urea-sulfamic acid solution is used, a temperature of about 212° to 235° F., preferably about 215° to 230° F., will increase the pH up to at least about 7.9. Generally, the solution boils at the temperature which changes the pH, and heating should be continued until after boiling has stopped to effect an irreversible pH change. Although the pH range is an important measurement of first stage reaction completion, a more important consideration is the acidity of the first stage product measured as parts per million parts of water (ppm). When the sulfamic acid is heated with the urea, undetermined reactions occur which not only raise the pH to a basic value, but also affect the acidity of the solution. Although it is not fully understood this higher acidity (higher than pure urea) is believed to account for the ultimate superior sizing composition achieved in this embodiment. Thus, the amount of sulfamic acid to urea is an important aspect of the invention of this embodiment and is best defined in terms of the resulting acidity (ppm) which it creates. The desired minimum acidity is at least 1,000 ppm, with a preferred minimum of 4,300. The actual amount of sulfamic acid is probably at least about 0.1% by weight of urea, with preferred amounts ranging from about 0.2% to about 8.0%. The maximum amount of sulfamic acid needed would be 15 or, at most, 20% by weight of urea to achieve the desired results. It has been found that 5% sulfamic acid produces an acidity of about 86,000 ppm with a pH of between 7.9 and 8.3 when processed in a 50% water, 50% urea plus sulfamic acid solution. Accordingly, sulfamic acid at 0.25% by weight of urea produces a first stage product with an acidity of 4,300 ppm. As indicated, the amount of sulfamic acid added to the solution is not as important as its resulting acidity in defining the first stage product of the novel size composition of this embodiment.

The second stage in preparing this novel size composition comprises diluting fortified or unfortified paste rosin size so as to produce a solution to which first stage product may be added. It is preferred to form a solution in order to form a more homogenous and workable rosin for mixing. Little or no water may be used, but preferably, sufficient water is used so as to enable proper mixing. The diluted rosin is heated to a temperature which aids in the mixing of the solution and at which the third stage may be carried out. This third stage merely comprises adding a diluted solution of first stage product, which is heated, to the heated second stage solution for chemical and physical mixing. Optionally, the third stage of the process may include the use of very small amounts of ammonium hydroxide to adjust the pH of the product back to greater than 7.5, when necessary. Amounts of ammonium hydroxide up to 0.05% by weight of solution will raise the pH to the desired range. The selection of first stage and second stage dilution concentrations is dependent on the desired relative amounts of sulfamic acid treated urea to rosin and on the desired concentration of the third stage product. The choice of mixing temperatures employed is a functon of workability and of the desired degree of chemical and physical mixing, although third stage temperatures of at least 80° F. prevent precipitation on mixing. This third stage mixing temperature should not exceed 140° F., however; otherwise, undesirable reactions may occur. It has been found that second stage mixing is best achieved at about 150° to 200° F., while third stage mixing is best achieved at 80° to 140° F., preferably about 125° F. These ranges are by no means limitations and are only exemplary of workable temperature ranges for a 3 parts water to 1 part rosin second stage solution and a third stage solution comprising one part second stage solution to one part 50% diluted first stage 50% water, 50% urea-sulfamic acid solution. The resulting third stage emulsion product, of which specific examples are more fully set out below, is a preferred embodiment of the novel size compositions of this invention.

In another ebodiment of the present invention, a novel sizing agent is produced according to the procedure outlined above, except that in the first stage, the urea and sulfamic acids are mixed cold at room temperature, at or above 62° F. The resulting mixture is then added to the second stage product, as above, to produce the third stage sizing composition. This agent is used in the pulp in combinaton with aluminum sulfate or as a tub size on a finished paper containing aluminum sulfate.

In another variation of the present invention, either of the above two first stage methods may be used with cold water or liquid size instead of paste size. Liquid sizing rosins, such as, for example, Tenneco N-700 rosin in isopropyl alcohol and others dissolved in water, do not require heating for dilution and do not require heating for mixing with the first stage product. Thus, the first and/or second and/or third stages of the urea-sulfamic acid-rosin solutions may be carried out without the addition of heat. While the liquid rosins are more expensive than the paste rosins, this added expense is more than offset by the cost reduction in equipment requiring no heating apparatus, and in process energy costs. As mentioned, these mixtures may be used in either pulp slurries or as surface sizes. When used in pulp slurries, the reactions which occur are enhanced by the heat applied to the paper sheets in their drying processes. However, since the reactions occur at room temperature, such heat addition is unnecessary.

In another embodiment, the urea-sulfamic acid mix, produced as described above, is merely mixed with a rosin size, with or without water, and heated to produce the desired rosin size composition. The amounts of constituents are dictated by the same considerations discussed above, and the cooking temperature and time are such that a permanent pH change has been effected. In this embodiment, preferably paste rosin size is used, although some liquid rosin size compositions may be used if such are not detrimentally affected by the heating step. Also, when liquid rosins are used, this single operation may be performed without heating.

While the products of the third stages are indicated to be preferred embodiment novel size compositions, the product resulting from the first stages of the above processes — the urea treated with sulfamic acid with or without heat — are useful compositions which may be added to other compositions to produce good sizing agents. For example, they may be added to wax, to hydrocarbon resin flake or to hydrocarbon-stearic acid mixtures wherein, for example, about 30 to 90% by total solids weight of the urea-sulfamic acid product may be combined with a mixture comprising equal parts hydrocarbon and stearic acid to produce a useful size. these compositions are produced in a manner similar to that outlined above wherein the first stage urea-sulfamic acid product is mixed with a second stage diluted solution, preferably at elevated temperatures when using paste rosins to permit more thorough mixing and reacting or at room temperature when using liquid rosins, to yield the finished solution or emulsion sizing agent. (By emulsion is meant a colloid of liquid or solid globules dispersed in an external liquid.)

A further discovery has been made with regard to the formation of a good emulsion in mixing the urea-sulfamic acid solutions with saponified rosin, wood rosin, hydrocarbon resins, stearic acid and wax or mixtures of these. It has been discovered that all of these solid materials can be very thoroughly emulsified with the urea-sulfamic acid mix by adding diethanolamine to the urea-sulfamic acid mix in the first stage. The above solid materials may then be added to the urea-sulfamic acid-diethanolamine emulsion to produce a thick milky emulsion having a pH greater than 7.5, for example, having a pH of about 8. The amount of diethanolamine used is preferably about 10 to about 50% by weight of urea plus sulfamic acid, but more or less may be used. The amounts of other materials may be widely varied and may be mixed. By using the diethanolamine emulsion, materials such as waxes, hydrocarbon flakes, stearic acid, and wood rosin may be more readily combined with the urea-sulfamic acid based solutions without heat, although heat may be used. Examples of this aspect of the invention illustrating the use of diethanolamine are set forth below.

Another preferred novel sizing composition or agent is a milky white emulsion produced by the combination of urea, sulfamic acid, an aluminum containing salt such as aluminum potassium sulfate or aluminium chloride or sodium aluminate, chromic acid, stearic acid or other fatty acid or fatty amide, ammonia and water. This novel size is made by a novel three stage process somewhat similar to the three stage processes described above. In this embodiment, the first stage consists of combining and treating commercially available urea with sulfamic acid, aluminum potassium sulfate, and water. In this embodiment, it is believed that both the acidity of the product resulting from the sulfamic acid, as discussed above, and the ionic nature of the aluminum potassium sulfate salt contribute to the increased effectiveness of the ultimate novel size composition. The urea, sulfamic acid, aluminum potassium sulfate and water are combined in a cooking vessel under slow agitation and heated to boil off the water. The temperature is raised to about 250° to 270° F. The pH of the solution begins to change, and heating is continued until a pH of about 7 or greater is achieved. The amount of sulfamic acid to urea ranges from as much as 15 or 20% by weight of urea down to 0.2% and even to as low as about 0.05%, taking into consideration the acidity of the solution as mentioned above in the urea-sulfamic acid treatment discussion. The amount of aluminum potassium sulfate used ranges from about 50% down to about 5% by weight based on the urea, and preferably is somewhere around 10 to 30%. At any rate, the resulting amount of urea based on the total solids in this first stage solution should exceed about 50 or 60% and preferably 65% based on the weight of the total solids. Water is used in amounts so as to produce a solution containing about 25 to about 90% solids. The temperature at which the pH changes to 7 or greater will vary with the proportions of components, but temperatures as high as 340° F. are not unusual. It is believed that the solution undergoes reactions at such temperatures, and that some biuret is formed when the solution turns to a milky white appearance. After this first stage treatment is completed, the product cools down to a white block material which may be used in that form or may be diluted to form a solution with water.

In the second stage, stearic acid (or aliphatic nitrogen derivative fatty acids, such as primary, secondary and tertiary amines, 1,3 propylene diamines and quaternary ammonium chloride salts, preferably those with 10 or more carbon atoms), chromic acid, ammonia, and water are combined in another cooking vessel. About equal parts water and stearic acid, and lesser parts of chromic acid, are used. Enough ammonia is used to effectively neutralize the stearic acid. For example, about 25% by weight of ammonia based on the weight of stearic acid will be sufficient. Chromic acid is added in amounts of less than 50% by weight based on the weight of stearic acid. The chromic acid is, however, an optional constituent and may be completely excluded from this composition. The most important component in this stage is the stearic acid (or fatty acid nitrogen derivatives) which is believed to act as a carrier and extender for the first stage composition. These second stage materials are mixed together cold and allowed to react. Water is added after the reaction is completed so as to produce, for example, a 10 to 50% solution. The reaction product mixture is then homogenized, for example, with standard milk homogenizers, to incorporate small undissolved particles into a fine emulsion.

In the third stage, about one to two up to three to one parts, based on solids, of the first stage and second stage products are combined at room temperature and homogenized to yield a preferred sizing composition having a pH of about 7 and having the appearance of milk. It is believed that the mix has an exceptional ability to go to negatively charged pulp slurry because of the strong positive charges given to the urea by both the sulfamic acid and the aluminum potassium sulfate in the first stage mix and by the stearic acid and chromic acid of the second stage mix. These sizing compositions are also superior due to their ability as emulsions to attach to the pulp fibers by physical means. This means that the novel sizings of the present invention go almost completely to the fibers and leave no residue in the whitewater.

In a variation of the immediately above process, a novel size composition is produced without the sulfamic acid and aluminum potassium sulfate. The urea is merely heated and combined with the second stage product — the stearic acid, chromic acid, ammonia, and water product — discussed above. The urea is first cooked and then combined with the second stage mixture at room temperature and permitted to react and then diluted with water and homogenized. It is beleived that, in this process, the stearic acid and chromic acid impart sufficient ionic properties to the urea to render it an advantageous sizing agent.

This method may be slightly altered in that the urea may not be cooked but merely dissolved in water before being combined with the stearic acid-chromic acid solution.

In another preferred embodiment of the present invention, a urea-sulfamic acid solution and another solution are combined in a four stage process. In this embodiment, the first stage is identical to the first stage of the first embodiment described above wherein a urea-sulfamic acid solution is produced. In the second stage, aluminum potassium sulfate or aluminum chloride or sodium aluminate is combined with about equal parts potassium chloride and lesser parts chromic acid and heated and mixed. Water is added to dilute the mix and cool it down. In the third stage, stearic acid, which has been neutralized with ammonia, is added to the warm second stage product. In this third stage, about equal parts based on solids of stearic acid is combined with the second stage product, although somewhat more may be used, and the chromic acid may be eliminated. In the fourth stage, the first stage product and the third stage product are combined to produce a 1:2 up to 3:1 parts, based on solids, first stage product to third stage product solution. The resulting fourth stage product is a homogeneous milky emulsion sizing agent with a pH of at least 7.

In other preferred methods of causing urea to perform as a sizing agent for cellulosic products in combination with aluminum ions, hydrocarbon resins and hydrocarbon resin emulsions are utilized as carriers to deposit the urea on the fiber and react with the other ingredients in the mix to further improve paper strength properties. For example, flaked hydrocarbon resins dissolved in perchloroethylene or trichoroethylene may be mixed with a first stage urea-sulfamic acid mix, or urea-sulfamic acid-aluminum potassium sulfate mix, as set forth above, or with urea dissolved in water with or without heat. In place of flaked hydrocarbon resins, alkaline emulsions of hydrocarbon resins, such as Velsicol, made by Velsicol Corp., for example, or substituted cationic acid emulsions of hydrocarbon resins, such as, for example, Piccopale C-1 emulsion produced by Pennsylvania Industrial Chemical Corp., may be used. In this embodiment, it is preferred to add the hydrocarbon resin constituent to the pulp directly, instead of first mixing it with the first stage product. The addition of the hydrocarbon is followed by the addition of the urea-sulfamic acid (with or without aluminum potassium sulfate) mix. As with the other sizing agents described herein, aluminum sulfate is added with this sizing composition to aid in the subsequent precipitation of the sizing composition onto the fibers. This aluminum sulfate should be added last so as to avoid undesired precipitation of only part of the sizing composition before it is mixed with the other constituents. Examples are set forth below.

In another embodiment of the present invention, urea is combined with aluminum chloride and cooked until a rapid pH increase occurs and until the pH reaches about 7. The temperature required is usually in the 260° to 300° F. range. The amount of aluminum chloride may be varied from about 5% by weight or less up to about 40 or 50% by weight, with a preferred range of from about 15% up to about 25% by weight based on the weight of the urea. After the mixture has been cooked to a pH of about 7, it is cooled down to about 50 to 100° F., and the pH is raised to about 8.5 by addition of sufficient ammonia. The temperature at which the ammonia is added is not critical, but a warm mixture is, of course, less viscous and addition is therefore enhanced by maintaining the mixture at elevated temperatures, e.g., 80° F. Next, stearic acid is added to the mix under agitation until thoroughly uniformly dissolved. The amount of stearic acid used ranges from about 5 to about 40 or 50% by weight based on the weight of urea, preferably 15 to 25% by weight. After the stearic acid has been mixed into the emulsion, it is homogenized to yield a thick, milky sizing agent.

In all of the above described embodiments using sulfamic acid, the acidity of the urea reaction product is altered considerably as mentioned. While sulfamic acid is the preferred component, phosphoric acid is a successful substitute and combinations of both sulfamic acid and phosphoric acid may be used.

In many embodiments of this invention, a milky or cloudy mixture or emulsion is produced. Such solutions may be rendered clear by the addition of small amounts of isopropyl alcohol to yield a more workable product. Other additives such as caustic soda or other alkaline materials may be used, but isopropyl alcohol is harmless to the novel sizing compositions and is preferred.

All of the sizing compositions described may be employed as a pulp additive or as a surface sizing agent in the manufacture of cellulosic products. The exact amount to be used to produce optimum results will vary slightly, depending on the type of pulp used and the desired properties of the finished product. Amounts equal to those currently used with known sizing compositions may generally be used to produce superior products. Thus, lesser amounts may be used to obtain similar products. The amount used will generally range from about 0.2 to about 3.5% by weight of solids based on the weight of fibers, usually about 0.5 to 2.0%. The sizing compositions may be used in more dilute solutions than known sizing compositions to permit a more uniformly distributed fiber placement or in concentrations similar to those currently used to permit faster machine operation due to the faster drying abilities of the novel compositions.

The methods and products of this invention are described further by the following examples. Unless otherwise indicated, the parts given are on a weight basis.

EXAMPLE 1

The first stage of this three stage process is as follows: 4,000 grams of commercially available urea, 200 grams of sulfamic acid, and 4,200 grams of water are placed in a cooking vessel and heated with slow agitation and brought to a boil. When the temperature reaches about 218° F., boiling stops, water losses cease, and the pH of the solution rises to above 7.5. The resulting product is a water clear solution having a pH of about 8 and an acidity of 86,000 ppm.

In the second stage, 3,450 grams of cold water are mixed with 1,150 grams of a commercially available rosin size known as Pexol 200 and produced by Hercules Powder Co. This mixture is heated to a temperature of about 170° F. for about 6 minutes under agitation to assure thorough dilution, and then lowered to 125° F. for addition of the first stage product.

In the third stage, 1,150 grams of the first stage product is diluted with 3,450 grams of water, heated to about 90° F., and added to the cooking vessel with the second stage solution, which is at 125° F., to produce the desired novel size composition which, in this example, contains equal amounts of first stage solids product and second stage rosin. Optionally, a pH adjustment may be made by adding, for example, no more than 4 to 5 grams of ammonium hydroxide per 10,000 grams of sizing composition. This sizing agent may be used either in the surface treatment of dried paper sheet or in pulp stock as a beater additive.

EXAMPLE 2

In this example, the first stage product and second stage product are the same as in Example 1, but in the third stage, three times as much diluted first stage product is added to the second stage rosin solution. The resulting emulsion contains 75% urea-sulfamic acid solids to 25% rosin solids to produce a superior sizing composition.

EXAMPLE 3

This example is similar to Example 1, except that the first stage product is made from combining 4,000 grams of urea with only 10 grams of sulfamic acid and 4,010 grams of water. The resulting first stage solution has a pH of about 8.0 and an acidity of 4,300 ppm.

The second and third stages of Example 1 are repeated, using this first stage product to yield an excellent size composition.

EXAMPLE 4

In this example, the first stage product and second stage product are the same as in Example 3, but in the third stage, three times as much diluted first stage product is added to the second stage rosin solution. The resulting emulsion is a preferred sizing agent which contains 75% urea-sulfamic acid solids to 25% rosin solids.

EXAMPLE 5

The novel sizing agent of Example 1 is used as a pulp additive as follows: 100 grams of dry fiber are placed in a beater with about 5,000 grams of water to produce a 2% fiber stock. This is beaten until the pulp is dispersed uniformly in the water. Next, 3.0 grams of the sizing composition of Example 1 are added while the solution is being beaten. Since the Example 1 composition consists of equal parts of urea-sulfamic acid and rosin, all in three times as much water, 3.0 grams of that composition added to 100 grams of fiber constitutes an addition of 0.75% solids size based on the weight of fiber solids. After the size has been beaten into the stock, 1.25 grams of alum is added and thoroughly mixed into the solution. The mix of fiber, sizing agent and alum is fed into a paper sheet former machine box and made into mat which is pressed and dried to produce a sized finished paper product. The size compositions of Examples 2 to 4 are employed in a similar manner.

EXAMPLE 6

The size composition of Example 1 is fed into a roll box which is placed in line in a paper making process downline from the paper driers. Dried sheet is passed through rollers wetted with the sizing agent and roller pressure is adjusted so that there is a net paper weight increase after subsequent drying of between ½ and 2% based on the total weight of the dried paper. Likewise, sizing agents of Examples 2 to 4 are similarly used.

EXAMPLE 7

The product resulting from the first stage of Example 1 is emulsified by the addition of 5 grams of diethanolamine to 100 grams of the urea-sulfamic acid first stage product. Next, 20 grams of wood rosin and 20 grams of stearic acid are added cold into the emulsion and mixed to produce a thick, milky white emulsion sizing agent having a pH of about 8.

EXAMPLE 8

The product resulting from the first stage of Example 3 is emulsified, and a novel size composition is produced, according to the procedure of Example 7 above.

EXAMPLE 9

100 grams of the first stage urea-sulfamic acid product of Example 1 is emulsified by the addition of 10 grams of diethanolamine, and then 10 grams of wood rosin and 10 grams of stearic acid are added cold and mixed into the emulsion to produce a thick, white emulsion sizing composition having a pH of about 8. The same procedure is followed with 100 grams of the first stage product of Example 3 to produce an excellent sizing composition.

EXAMPLE 10

100 grams of Example 1 first stage product are emulsified with 20 grams of diethanolamine, and subsequently 20 grams of stearic acid and 20 grams of hydrocarbon resin flake known as Neuroz-LX782B, produced by Neville Chemical Co., are mixed cold to yield a milky thick emulsion sizing agent. The same procedure is used with the first stage product of Example 3 to produce a novel sizing agent.

EXAMPLE 11

100 grams of first stage Example 1 product are emulsified with 20 grams of diethanolamine and, subsequently, 20 grams of wood rosin, 10 grams of wax and 10 grams of stearic acid are added to form a thick emulsion sizing composition having a pH of about 8. The same procedure is used to produce a sizing composition using the first stage composition of Example 3.

EXAMPLE 12

The first stage of this process is as follows: 180 grams of water, 400 grams of urea, 20 grams of sulfamic acid, and 80 grams of aluminum potassium sulfate are mixed in a cooking vessel. The resulting mixture has an initial pH of about 2.8. The mix is heated under slow agitation and cooked to boil off the water. As the temperature rises to 260° F., the pH begins to rise steadily to a pH of about 7 as the mix temperature reaches a maximum of 340° F. At this temperature, the heating is stopped and the product permitted to cool into a white solid block.

In the second stage, 100 grams of stearic acid, 25 grams of chromic acid, 25 grams of ammonia, and 125 grams of water are mixed together cold and left to react for about 15 minutes. Water is added to bring this product up to about 75% water based on the total weight. At this point, the second stage solution has a reddish-yellow appearance. The solution is next homogenized.

In the third stage, a 50% solution of dissolved first stage product is mixed with equal parts, based on solids, with the second stage product. This mixing is done at room temperature and is followed by homogenization to produce a milk-like emulsion size composition with a pH of about 7.

EXAMPLE 13

In this example, the first and second stages are the same as in Example 12 above, but in the third stage, twice as much first stage product is mixed with the second stage product.

EXAMPLE 14

This example is identical to Example 12, except that 80 grams of aluminum chloride is used in the first stage in place of the aluminum potassium sulfate.

EXAMPLE 15

This example is identical to Example 12, except that 80 grams of sodium aluminate replaces the aluminum potassium sulfate in the first stage.

EXAMPLE 16

180 grams of water and 400 grams of urea are cooked to boil off the water and then combined with the second stage product of Example 12 according to the third stage of that example to produce an emulsion sizing composition.

EXAMPLE 17

400 grams of urea are dissolved in 200 grams of water and combined with the second stage product of Example 12 according to the third stage of that example to yield a novel sizing agent.

EXAMPLE 18

In this four stage process, the first stage product is produced as set out in the first stage of Example 1 or Example 3 above. In the second stage, 40 grams of aluminum potassium sulfate, 40 grams of potassium chloride, and 20 grams of chromic acid are combined in another cooking vessel and slowly agitated and heated to about 300° F., and a pH of 7 to 7.5 Water is added to cool the mix and bring it to a 50% solids content. In the third stage, 100 grams of neutralized stearic acid is added when the second stage product has cooled to 80° F. or so. It is then homogenized. In the fourth stage, equal parts, based on solids, of the first and third stage products are combined to produce an excellent sizing composition.

EXAMPLE 19

In this four stage example, the first stage product is made by adding 20 grams of sulfamic acid and 400 grams of urea to 100 grams of water and heating to a temperature of about 260° F., and a pH of about 7. The second, third, and fourth stages are identical to the corresponding stages of Example 18.

EXAMPLE 20

5 pounds of solids of an alkaline emulsion of hydrocarbon resins known as Velsicol W617, produced by Velsicol Corp., are added to 2,000 pounds of fiber in a slurry of one percent consistency. 10 pounds of a mixture (about 5 pounds of solids) produced by combining 400 parts urea, 20 parts sulfamic acid, 80 parts aluminum sulfate and 180 parts water heated to 340° F. and then cooled with 500 parts of water, is immediately added to the slurry under agitation. Next, 10 pounds of aluminum sulfate are added to slurry to aid in precipitation of the sizing composition and carrier. This slurry is fed to a paper making machine to produce sheets having superior dry strength properties.

EXAMPLE 21

5 pounds of solids of a substituted cationic acid emulsion of hydrocarbon resins known as Piccopale C-1 Emulsion, made by Pennsylvania Industrial Chemical Co., are added to 2,000 pounds of pulp in a one percent solution. Next, 10 pounds of an equal parts urea dissolved in water solution are added to the pulp slurry, and then 10 pounds of aluminum sulfate are mixed in to precipitate the novel sizing composition to produce a pulp from which cellulosic products are made.

EXAMPLE 22

40 grams of aluminum choloride (32 Baume) are added to 200 grams of urea in a cooking vessel and heated until a rapid increase in pH occurs. In this instance, the change begins at about 260° F. The mixture is further heated until a pH of about 7 is reached, and is then cooled down to 80° F. Ammonia is added until the pH has risen to 8.5. Next, 40 grams of stearic acid are added under agitation and mixed until uniformly distributed. The mixture is then homogenized to produce a sizing composition emulsion.

Most of the sizing compositions produced by the above examples have been tested and compared with products made with conventional sizing agents and exhibit superior properties.

In one series of tests, compositions of Examples 1, 3, 12, 16, 17, and 20, as well as two conventional sizing compositions (both containing the rosin sizing agent known as Pexol 200, produced by Hercules Powder Co.), are treated as follows: The compositions are combined with alum in bleached hardwood kraft to compare their performance. Handsheets are made using 5.7 grams of fiber diluted in water to a 1% solution. The fiber and water are blended in a Waring blender for about one minute and then the novel sizing compositions are added and mixed for about 45 seconds and then the alum is added. These slurries are then further diluted with water to a fiber solution of about 0.1% by weight of fiber solids. Sheets are then formed with a Williams handsheet former from slurries made with each of the compositions of the tested Examples. The sheets are placed between two blotters and dried in a hot press having temperatures of about 230° F. and exerting a pressure of about 50 pounds per square inch. The sheets are then conditioned for 24 hours at 50% relative humidity and 72° F. and tested. The tests made are the standard Tappi Cobb Test, the Ink Float Test, and the Dry Mullen Tests. The results are set out in Table I:

TABLE I

| Slurry Containing: | Tappi Cobb Test | Ink Float | Dry Mullen |
|---|---|---|---|
| (Wt. % solids based on fiber solids) | | (Minutes) | |
| 1% Pexol, 1-1/2% Alum | 32 | 5 | 11 |
| 1/2% Pexol, 3/4% Alum | 68 | 1 | 14 |
| 1% Example 1, 1-2/5% Alum | 28 | 2 | 40 |
| 1/2% Example 3, 1-1/2% Alum | 28 | 5 | 15 |
| 1/2% Example 12, 1/2% Alum | 20 | 4 | 24 |
| 1/2% Example 16, 1/2% Alum | 168 | — | — |
| 1/2% Example 17, 1/2% Alum | 212 | — | — |

As illustrated by Table 1, the novel sizing compositions are comparable to or surpass conventional rosin sizes. Besides these property advantages, the novel compositions are produced at a substantially lower cost as compared to the known rosin sizing agents. Other advantages are discussed above.

In another series of tests, a similar testing procedure was used to compare the compositions of Examples 1, 7, 9, 10, and 11, the last four being directed to using emulsifying agents and various hydrocarbon resin and wax mixes. The results are shown in Table II:

TABLE II

| Slurry Containing: | Tappi Cobb Test | Ink Float | Dry Mullen |
|---|---|---|---|
| (Wt. % solids based on fiber solids) | | (Minutes) | |
| 3/4% Example 1, 1% Alum | 40 | 1.5 | 30 |
| 3/4% Example 7, 1% Alum | — | 0.5 | 36 |
| 3/4% Example 9, 1% Alum | 28 | 2.1 | 37 |
| 3/4% Example 10, 1% Alum | 48 | 0.8 | 48 |
| 3/4% Example 11, 1% Alum | 12 | 2.5 | 29 |

A comparison of Table II results with the conventional sizing composition results shown in Table I, indicates that the emulsified hydrocarbon resin - sulfamic acid treated, urea based compositions are competitive with conventional sizing agents, yet these are produced with at least a 20% cost savings.

It is claimed:

1. A sizing agent comprising an aqueous mixture of a component selected from the group consisting of rosin, hydrocarbon resins, stearic acid, wax and their mixtures, and the reaction product of a mixture of urea and sulfamic acid wherein the sulfamic acid has been combined with the urea in an amount sufficient to produce an acidity of said reaction product of at least 1,000 parts per million and wherein said reaction product has a pH of at least 7.

2. The sizing agent of claim 1 wherein the component is rosin and the sizing agent comprises from about 15 to about 75 percent by weight of said rosin and from about 85 to about 25 percent by weight solids of said reaction product.

3. The sizing agent of claim 2 wherein said sulfamic acid comprises from about 0.1 percent up to about 20 percent by weight of said urea to form said reaction product.

4. The sizing agent of claim 2 wherein said sulfamic acid comprises from about 0.2 percent up to about 8 percent by weight of said urea and produces an acidity of at least 4,000 parts per million in said reaction product.

5. The sizing agent of claim 2 wherein said sulfamic acid comprises from about 0.01 percent up to about 20 percent by weight of said urea to form said reaction product.

6. The sizing agent of claim 2 wherein said sulfamic acid comprises form about 0.2 percent up to about 8 percent by weight of urea and produces an acidity of at least 4,000 parts per million in said reaction product.

7. A method of making a sizing agent comprising mixture urea and sulfamic acid and reacting them to form a reaction product having a pH of at least 7 wherein said sulfamic acid is used in an amount sufficient to produce a reaction product acidity of at least 1,000 parts per million, and combining said reaction product with a component selected from the group consisting of rosin, hydrocarbon resins, stearic acid, wax and their mixtures, and water to produce an aqueous product.

8. The method of claim 7 wherein the component is rosin and said mixing and reacting are performed at room temperature.

9. The method of claim 8 wherein the component is rosin and said reacting occurs at an elevated temperature which does not exceed 235° F.

10. The method of claim 7 wherein the component is rosin and said urea and sulfamic acid are combined in aqueous form and said reacting is carried out at a temperature between 215° and 230° F., and is continued until the water ceases to boil off.

11. The method of claim 7 wherein the componet is rosin and said combining is performed at room temperature.

12. The method of claim 7 wherein the component is rosin and said combining is performed at an elevated temperature which does not exceed 140° F.

13. The method of claim 7 wherein the component is rosin and the sulfamic acid comprises from about 0.1 percent up to about 20 percent by weight of said urea to form said reaction product and produces an acidity of at least 1,000 parts per million in said reaction product.

14. The method of claim 7 wherein the component is rosin and the sulfamic acid comprised from about 0.2 percent up to about 8 percent by weight of said urea to form said reaction product and produces an acidity of at least 4,000 parts per million in said reaction product.

15. The method of claim 7 wherein the component is rosin and from about 25 percent to about 85 percent by weight solids of said reaction product is combined with from about 75 percent to about 15 percent by weight solids of rosin based on the total solids weight.

16. A sizing agent comprising an aqueous emulsion of the reaction product of a mixture of urea and sulfamic acid, a sizing carrier selected from the group consisting of rosin, hydrocarbon resins, stearic acid, wax and their mixtures, and diethanolamine.

17. The sizing agent of claim 16 wherein said sizing carrier comprises a hydrocarbon resin-containing material.

18. The sizing agent of claim 17 wherein said hydrocarbon resin-containing material is flake hydrocarbon resin.

19. The sizing agent of claim 17 wherein said hydrocarbon resin-containing material is a mixture of hydrocarbon resin and stearic acid.

20. The sizing agent of claim 16 wherein said sizing carrier is a mixture of wood rosin and stearic acid.

21. The sizing agent of claim 16 wherein said sizing carrier is a mixture of wood rosin, wax, and stearic acid.

22. A method of making a sizing agent comprising mixing urea and sulfamic acid and reacting them to form a reaction product, adding diethanolamine and water to said reaction product, and adding a sizing carrier selected from the group consisting of hydrocarbon resins, rosin, stearic acid, wax and their mixtures to the resulting mixture to produce an aqueous emulsion product.

23. The method of claim 22 wherein said mixing and reacting are carried out at room temperature.

24. The method of claim 22 wherein said urea and sulfamic acid are mixed in aqueous form and said reacting is carried out at a temperature between 215° and 235° F. and is continued until the water ceases to boil off.

25. The method of claim 22 wherein the sizing carrier is added at room temperature.

26. The method of claim 22 wherein the sizing carrier is added at an elevated temperature not exceeding 140° F.

27. The method of claim 22 wherein said sizing carrier is selected from the group consisting of flake hydrocarbon resins, mixtures of wood rosin and stearic acid, mixtures of wood rosin, wax, and stearic acid, and mixtures of hydrocarbon resins and stearic acid.

28. A sizing agent comprising an aqueous emulsion of two mixtures, the first mixture containing the reaction product of urea, sulfamic acid, and an aluminum containing salt reacted at an elevated temperature, and the second mixture comprising stearic acid, ammonia, and water.

29. The sizing agent of claim 28 wherein said aluminum containing salt is selected from the group consisting of aluminum potassium sulfate, aluminum chloride, and sodium aluminate.

30. The sizing agent of claim 28 containing an amount of ammonia sufficient to neutralize said stearic acid.

31. The sizing agent of claim 28 wherein said second mixture further contains chromic acid.

32. The sizing agent of claim 28 wherein said first mixture is an aqueous mixture.

33. The method of making a sizing agent comprising forming a first mixture by combining urea, sulfamic acid and an aluminum containing salt and reacting them at an elevated temperature to produce a product having a pH of at least 7, forming a second mixture by combining stearic acid, ammonia, and water wherein sufficient ammonia is used to neutralize said stearic acid, and combining the first and second mixtures to produce an aqueous emulsion product.

34. The method of claim 33 wherein said aluminum containing salt is selected from the group consisting of aluminum potassium sulfate, aluminum chloride, and sodium aluminate.

35. The method of claim 33 wherein said second mixture contains chromic acid.

36. The method of claim 33 wherein said first mixture is an aqueous mixture.

37. A sizing agent comprising an aqueous emulsion of three mixtures, the first mixture containing the reaction product of urea and sulfamic acid, the second mixture containing the reaction product of chromic acid, potassium chloride, and an aluminum containing salt selected from the group consisting of aluminum potassium sulfate, aluminum chloride, and sodium aluminate, and the third mixture containing aqueous stearic acid neutralized with ammonia.

38. A method of making a sizing agent comprising forming a first mixture by combining urea and sulfamic acid and reacting them, forming a second mixture by combining chromic acid, potassium chloride, and an aluminum containing salt selected from the group consisting of aluminum potassium sulfate, aluminum chloride, and sodium aluminate, and reacting them at an elevated temperature, forming a third mixture by neutralizing aqueous stearic acid with ammonia, mixing said second and third mixtures at an elevated temperature and adding the first mixture to the resulting mixture to form an aqueous emulsion product.

39. The method of claim 38 wherein said urea and sulfamic acid are combined into an aqueous form and reacted at an elevated temperature at least until water ceases to boil off.

40. A sizing agent comprising an aqueous emulsion of two mixtures, the first mixture containing the reaction product of urea sulfamic acid, and the second mixture containing hydrocarbon resin-containing material selected from the group consisting of hydrocarbon resins dissolved in an organic solvent, alkaline emulsions of hydrocarbon resins, and substituted cationic acid emulsions of hydrocarbon resins.

41. The sizing agent of claim 40 wherein said first mixture is an aqueous mixture.

42. The sizing agent of claim 40 wherein said first mixture is an aqueous mixture and further contains an aluminum containing salt selected from the group consisting of aluminum potassium sulfate, aluminum chloride, and sodium aluminate.

43. A method of making a sizing agent comprising forming a first mixture by combining urea and sulfamic acid and reacting them to produce a product having a pH of at least 7, and adding the first mixture to a second mixture containing hydrocarbon resin-containing material selected from the group consisting of hydrocarbon resins dissolved in an organic solvent, alkaline emulsions of hydrocarbon resins, and substituted cationic acid emulsions of hydrocarbon resins, to produce an aqueous emulsion product.

44. The method of claim 43 wherein said first mixture is an aqueous mixture and said reacting is carried out at an elevated temperature at least until water ceases to boil off.

45. The method of claim 44 wherein said first mixture is an aqueous mixture and contains an aluminum containing salt selected from the group consisting of aluminum potassium sulfate, aluminum chloride, and sodium aluminate.

46. The method of claim 44 wherein said first mixture is combined with said second mixture by first adding said first mixture to a pulp slurry and immediately thereafter adding said second mixture to said pulp slurry.

47. A sizing agent comprising an aqueous mixture of rosin and the reaction product of a mixture of urea and phosphoric acid wherein the phosphoric acid has been combined with the urea in an amount sufficient to produce an acidity of said reaction product of at least 1,000 parts per million and wherein said reaction product has a pH of at least 7.

48. The sizing agent of claim 47 comprising from about 15 to about 75 percent by weight of said rosin and from about 85 to about 25 percent by weight solids of said reaction product.

49. The sizing agent of claim 47 wherein said phosphoric acid produces an acidity of at least 4,000 parts per million in said reaction product.

50. A method of making a sizing agent comprising mixing urea and phosphoric acid and reacting them to form a reaction product having a pH of at least 7 wherein said phosphoric acid is used in an amount sufficient to produce a reaction product acidity of at least 1,000 parts per million, and combining said reaction product with rosin and water to produce an aqueous product.

51. The method of claim 50 wherein said mixing and reacting are performed at room temperature.

52. The method of claim 51 wherein said reacting occurs at an elevated temperature.

53. The method of claim 50 wherein said combining is performed at room temperature.

54. The method of claim 50 wherein said combining is performed at an elevated temperature which does not exceed 140° F.

55. The method of claim 50 wherein the phosphoric acid produces an acidity of at least 4,000 parts per million in said reaction product.

56. The method of claim 50 wherein from about 25 percent to about 85 percent by weight solids of said reaction product is combined with from about 75 percent to about 15 percent by weight solids of rosin based on the total solids weight.

57. A sizing agent comprising an aqueous emulsion of the reaction product of a mixture of urea and phosphoric acid, a sizing carrier, selected from the group consisting of rosin, hydrocarbon resin, stearic acid, wax and their mixtures and diethanolamine.

58. A method of making a sizing agent comprising mixing urea and phosphoric acid and reacting them to form a reaction product, adding diethanolamine and water to said reaction product, and adding a sizing carrier selected from the group consisting of rosin, hydrocarbon resin, stearic acid, wax and their mixtures to the resulting mixture to produce an aqueous emulsion product.

* * * * *

UNITED STATES PATENT AND TRADEMARK OFFICE
CERTIFICATE OF CORRECTION

PATENT NO. : 4,025,354
DATED : May 24, 1977
INVENTOR(S) : Ralph Emerson et al.

It is certified that error appears in the above-identified patent and that said Letters Patent are hereby corrected as shown below:

Column 4, line 39 - the word "ebodiment" should be --embodiment--.

Column 4, line 47 - the words "tub size" should read --"tub size"-- (the quotation marks were omitted).

Column 5, line 25 - the word "these" should read --These--.

Column 7, line 14 - the word "beleived" should be --believed--.

Column 10, line 44 - the word "Neuroz" should read --Nevroz--.

Column 13, line 68 - "0.01" should be --0.1--.

Column 16, line 22 - the word "and" should be inserted between urea sulfamic to read --urea and sulfamic--.

Signed and Sealed this

Twentieth Day of September 1977

[SEAL]

Attest:

RUTH C. MASON
Attesting Officer

LUTRELLE F. PARKER
Acting Commissioner of Patents and Trademarks